US006523014B1

(12) United States Patent
Pauschinger

(10) Patent No.: US 6,523,014 B1
(45) Date of Patent: Feb. 18, 2003

(54) FRANKING UNIT AND METHOD FOR GENERATING VALID DATA FOR FRANKING IMPRINTS

(75) Inventor: Dieter Pauschinger, Hohen Neuendorf (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 0 days.

(21) Appl. No.: 09/268,267

(22) Filed: Mar. 15, 1999

(30) Foreign Application Priority Data

Mar. 18, 1998 (DE) ........................................ 198 12 903

(51) Int. Cl.[7] ............................ G06F 17/00; G06F 9/00
(52) U.S. Cl. ........................ 705/410; 705/401; 705/405
(58) Field of Search ................................ 705/410, 401, 705/405, 408

(56) References Cited

U.S. PATENT DOCUMENTS

| | | | | |
|---|---|---|---|---|
| 5,161,109 A | | 11/1992 | Keating et al. | |
| 5,233,657 A | | 8/1993 | Günther | |
| 5,257,197 A | | 10/1993 | Günther et al. | |
| 5,625,694 A | | 4/1997 | Lee et al. | |
| 5,625,839 A | | 4/1997 | Kohler et al. | |
| 5,774,554 A | * | 6/1998 | Gilham | 380/51 |
| 5,982,896 A | * | 11/1999 | Cordery et al. | 380/21 |
| 6,009,417 A | * | 12/1999 | Brookner et al. | 705/410 |
| 6,041,704 A | * | 3/2000 | Pauschinger | 101/91 |
| 6,058,193 A | * | 5/2000 | Cordery et al. | 380/284 |
| 6,111,952 A | * | 8/2000 | Patarin | 380/45 |
| 6,151,591 A | * | 11/2000 | Pierce et al. | 705/401 |
| 6,175,826 B1 | * | 1/2001 | Malandra, Jr. et al. | 705/410 |
| 6,212,281 B1 | * | 4/2001 | Vanstone | 380/282 |
| 6,249,777 B1 | * | 6/2001 | Kara et al. | 705/404 |

FOREIGN PATENT DOCUMENTS

| | | | | |
|---|---|---|---|---|
| DE | 38 40 041 | | 6/1990 | |
| EP | 0214609 A2 | * | 3/1987 | H04L/9/00 |
| EP | 0 663 652 | | 7/1995 | |
| EP | 0 782 296 | | 7/1997 | |
| WO | WO-9820461 A2 | * | 5/1998 | |
| WO | WO 98/57302 | | 12/1998 | |
| WO | WO-200057258 A2 | * | 9/2000 | G06F/17/60 |

OTHER PUBLICATIONS

Whelan, "SmartStamp jumps first hurdle," Electronic News, Apr. 6, 1998, v44, n2213, 2 pages.*
Anonymous, "The electronic mailcenter," Office Systems, Aug. 1998, v15, n8, 4 pages.*

* cited by examiner

*Primary Examiner*—Tariq R. Hafiz
*Assistant Examiner*—Marc Norman
(74) *Attorney, Agent, or Firm*—Schiff Hardin & Waite

(57) ABSTRACT

A franking unit for low mail volume is composed of a computer and with a connected printer. The computer has a memory with a local data bank for postal recipient address datafiles and is connected via a communication path to a data center that comprises a central data bank. The computer is appropriately programmed so that request data are formed and communicated to the data center and requested data that are communicated back and are received and stored. A method for generating valid data for franking imprints includes the steps of formation and transmission of request data for a signature, verification of communicated data in a data central, generation of a signature on the basis of verified data using an asymmetrical crypto algorithm and secret private key, as well as re-transmission of the verified data and of the signature to the franking unit, wherein the authenticity of the data transmitted back can be checked on the basis of the signature using a public key, as well as storage of authentic, received data in the local data bank.

12 Claims, 1 Drawing Sheet

FRANKING UNIT AND METHOD FOR GENERATING VALID DATA FOR FRANKING IMPRINTS

BACKGROUND OF THE INVENTION

1. Field of the Invention

The invention is directed to a franking unit and to a method for generating valid data for franking imprints, of a type suited for use in the domestic area and by users who send only a few items of mail.

2. Description of the prior Art

German PS 40 18 166 discloses a franking module for a personal computer for users with low mail volume. The franking module, which allows both the franking as well as the addressing of envelopes, is arranged in the personal computer's slot of a drive insert. Such a franking module is surrounded by a secured housing and has the same structure in terms of circuitry as a postage meter machine without a letter transport means. It is self-evident that a franking module de-equipped in this way can be offered more cheaply than a postage meter machine.

By using the franking module, the debiting of the franking valve and the printing of the franking stamp image cannot be externally manipulated. The address data are read from a memory administered by the personal computer and are supplied to the franking module via the internal information network. It is still possible, however, that faulty address data can be printed which will cause the mail carrier to have difficulty delivering the item to the recipient, or the item will not be able to be delivered at all. Given a digital printing process, it is difficult to determine whether the printed franking stamp image is merely an unpaid for copy of an earlier imprint which was combined with a desired, different address. Specific, red fluorescent inks that are difficult to copy have therefore been prescribed by postal authorities. As a result of the progress made in the meantime in color copiers and color printers, such a measure can no longer be considered a serious obstacle to producing counterfeit, unpaid imprints.

A printer with which letters can be printed and with which addresses can also be printed on envelopes also usually is connected to a personal computer. In principle, the envelope also can be franked with such a printing, however, it is difficult to prevent tampering given such open systems. A tamperer could attempt to supply data into the system via the unsecured connecting lines with fraudulent intent, the data appearing to come from an authorized source.

United States Postal Service (USPS) published a catalogue in 1996 identifying requirements for the design of future secured franking systems (Information Based Indicia program, IBIP). It is urged therein that certain data be cryptographically encoded and be printed on the letter to be franked in the form of a digital signature with reference to which the postal authority can check the legitimacy of franking imprints. According to estimates, the USPS suffers an annual loss of approximately $200 million due to fraud. These requirements have been differentiated according to type of postage meter machine. Conventional postage meter machines, which usually only print a franking stamp in red, are referred to as "closed systems" and, differing from those referred to as "open systems" (PC franking machines), need not co-incorporate the corresponding letter address into the encryption. A security module with advanced crypto technology and a secured housing in which data from a data center can be written continues to be prescribed for open systems.

U.S. Pat. No. 5,625,839 discloses sending update information to the postage meter machine as a data packet. A CRC check sum is used to check that the data transmission was free of error, but this conveys nothing about the correctness of the transmitted data content itself. A problem could arise because of the unprotected connecting line if a tamperer—with fraudulent intent—attempts to supply data into the postage meter machine as if the data came from the data center.

German OS 38 40 041 therefore discloses an arrangement in which a postage meter machine is connected to a central computer via a TEMEX dedicated line that is always in operation. The postal customer enters the desired franking value into the postage meter machine. This is transmitted to the central computer, which is connected to an endorsement computer at which the customer has a postal giro account. After checking for sufficient funds, the endorsement computer undertakes the debiting and the central computer enables the franking function. The postage meter machine itself also has additional postal memories that can be interrogated on the basis of the data connection and offer an additional security against data loss in case of a computer failure. The central computer triggers an alarm if this dedicated line is tapped in unauthorized fashion or is interrupted. Utilizing such a specific, secured line, however is complicated and is not possible everywhere.

European Application 373 971 discloses a communication system wherein communication of address data from a local data bank to a central data bank in a data center takes place. An updating of the stored address data in the one central data bank of the data center on the basis of the communicated address data and a modification of the address data of the local data banks present in the system on the basis of the updated data of the data center is also undertaken.

Equivalency of the data in every local data bank corresponding to the data in a central data bank is thus in fact achieved. Given an unprotected connecting line, however, having an incorrect address stored in the central data bank of the data center and having it transmitted from their to the respective local data bank of the other users cannot be prevented.

European Application 782 296 discloses a public key method for fetching a certificate from an address book memory via an unprotected communication connection, but this can only assure that the communicated message is authentic. A counterfeit message whose certificate is real, however, could just as easily be transmitted.

In addition to the correctness and veracity of a message, the correct debiting is also a concern in franking systems. A postage box in a terminal (U.S. Pat. No. 5,233,657) or a secured module (U.S. Pat. No. 5,625,694) in which the accounting data are stored has therefore already been proposed.

The terminal according to the solution disclosed in U.S. Pat. No. 5,233,657 is used as a telefax and franking device, whereby critical franking image data are requested from a data center and are then printed out as a franking imprint completed with other image data that are stored in the terminal. The communication between the terminal and the data center is secured with a cryptographic method, for example according to the known RSA method. The central processing unit of the terminal generates a security code from the data identifying the terminal and this is printed together with the postage value. A disadvantage of this approach is the tedious calculating work that the central processing unit must implement, first when image data are decrypted according to the RSA method and, second, when the security code is generated.

In U.S. Pat. No. 5,625,694, a computer is equipped with a secured module. Given a request of a digital signature to such a secured module, the request ensuing dependent on a change with respect to the input postage value and a recipient address, the secured module then generates, first, a corresponding digital signature and communicates this to the microprocessor of the computer and, second, also implements the debiting. The microprocessor of the computer then generates a print image corresponding to the postage value and the recipient address as well as the communicated signature. A signature is not requested from the secured module only if neither the postage value nor the address is changed. A copy of the same imprint is thus not co-debited in the secured module. The authenticity check for every individual piece of mail is left to the mail carrier. Even the slightest differences in the address have an effect on the signature, however, it is not certain that the user will enter a valid recipient address. A piece of mail provided with an invalid recipient address may possibly not be able to be delivered, even though it was franked with valid postage and the postage was properly debited in the secured module, because the address cannot be subsequently corrected. The necessity of arranging a secured module in the terminal equipment is a complication in all of the aforementioned solutions.

SUMMARY OF THE INVENTION

An object of the present invention is to provide a low-end franking unit with a local data bank, wherein valid addresses are stored in the local data bank of the franking unit. It is a further object to provide a method for generating valid data for franking imprints should be recited, so that valid postage values with valid addresses can be printed onto the piece of mail together with a signatures as a result.

The above object is achieved in accordance with the principles of the present invention in a franking unit having a first computer and a printer connected thereto, the first computer containing a memory with a local data bank for postal recipient addresses. The franking unit, and specifically the first computer, is in communication via a communication path With a second computer at a data center remote from the franking unit, this second computer having access to a central data bank. The first computer is programmed to access a stored, specific postal recipient address or to intermediately store a newly entered, specific postal recipient address, and to communicate this postal recipient address in the context of request data to the data center. The request data include identification data of the mail sender (i.e. the party operating the franking unit) plus postal shipping data including the specific postal recipient address. The second computer at the data center checks the correctness of the postal recipient address in the request data on the basis of an address file stored in the central data bank. If and only if the postal recipient address transmitted in the request data is correct, the second computer at the data center transmits a valid postage value and a security signature to the first computer at the franking unit. If the postal recipient address transmitted by the first computer in the request data is not correct and if it is not possible for the second computer to correct the incorrect postal recipient address, the second computer transmits an error message, and does not transmit a postage value or a security signature. If and when the postage value and security signature are received by the first computer, the first computer operates the franking unit to print an authentic franking imprint, incorporating the postage value and the security signature, onto a piece of mail.

The above object is also achieved in accordance with the invention in a method for generating valid data for a franking imprint, wherein a franking unit formulates request data and transmits the request data to a data center, remote from the franking unit via a communication path, and requested data are transmitted back to the franking unit and are stored therein. The formulation and communication of the request data are undertaken by a first computer, at the franking unit, and the request data include a security signature from a second computer located at the data center. The request data include at least one information group with postage recipient address data and identification data relating to the franking unit which transmitted the request data. At the second computer, the postal recipient address data contained in the request data are compared to address data in a central data bank, to which the second computer has access. Only upon verification that the postal recipient address is correct does the second computer then generate a security signature, using the verified data and an asymmetrical crypto-algorithm and a secret private key. The verified data and the security signature are transmitted from the second computer back to the first computer. At the first computer, the authenticity of the data sent from the second computer can be checked on the basis of the security signature, using a public key. Assuming the data transmitted from the second computer are found to be authentic, the data are then stored in a local data bank at the first computer.

The necessity of arranging a secured module in the terminal equipment is eliminated in the inventive apparatus and method. The necessity or reloading a credit into the terminal equipment and designing the communication correspondingly secure against manipulation of the credit thus is also eliminated. Inventively, a digital signature is generated in a data center of a postage meter machine manufacturer, or of a mail carrier. The communication with the data center is relatively short since the communicated cleartext data do not contain image data nor are all data encrypted; instead, only a relatively short signature is transmitted back in addition to the cleartext data. The service of the data center with respect to an incorrectly input mail recipient address is also advantageous. Misfrankings can thus be avoided. In one version, a calculation of the postage according to the currently valid fee schedule can be undertaken by the data center as an additional service. The fact that secret keys and other security-relevant data are only stored in the data center and cannot be read out from the outside is also beneficial to the dependability against tampering. Imprinting the communicated data onto the piece of mail can also ensue at an arbitrarily later point in time. There are no limitations with respect to the external image generation from the communicated data. Different printing methods can thus be utilized. The different use conditions and demands of the individual mail carriers can be met best in this way.

DESCRIPTION OF THE PREFERRED EMBODIMENTS

Figure 1:
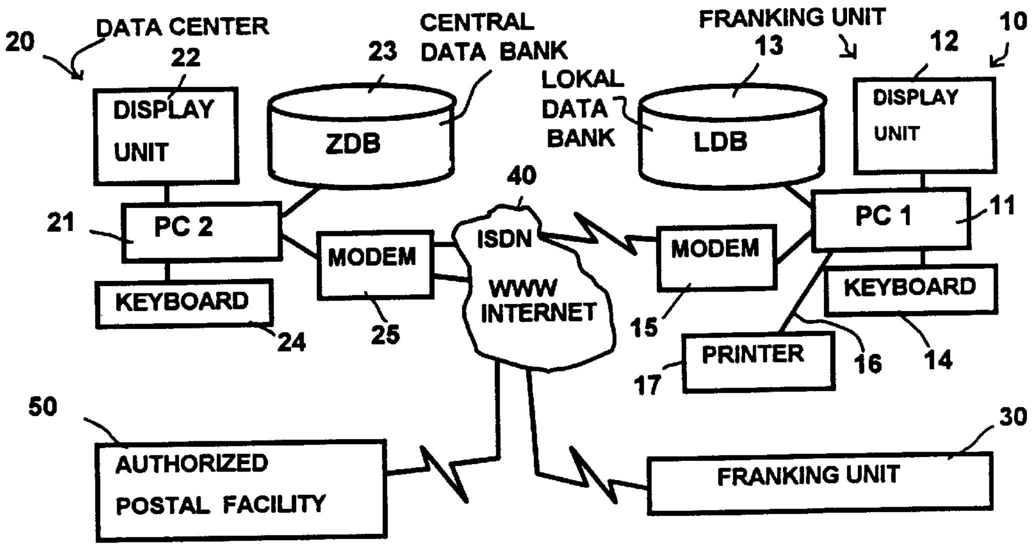
FIG. 1 is a block circuit diagram of a franking unit and the data center.

In the block circuit diagram according to FIG. 1, a data center 20 is communicatively connected via a communication network 40 to postage meter machines 10 and 30 and to an inspection point 50 of the mail carrier, for example in the post office. The franking unit 10 is fashioned as a digital printer 17 controlled by a first computer that can at least print envelopes of one format. For example, a personal computer PC 1 is connected to the printer 17 via an unsecured cable 16 and can also set up a communication connection on-line to the data center 20 via a modem 15 and the communication network 40. A hard drive memory 13 for a local data bank LDB, a keyboard 14 and a display unit 12 are connected to the first computer 11. Corresponding inputs can be made and displayed or further program steps can be monitored with these input/output unit 12 and 14. Matching of the dataset of the local data bank and a storing of the communicated data ensue during the on-line connection. The generation of imprints on the basis of the communicated, stored data can ensue at a later point in time.

The data center 20 is composed of a second computer 21, preferably a personal computer PC 2, with connected input/output unit 22 and 24, a hard drive 23 of a central data bank ZDB and at least one modem 25. The hard drive 23 stores specific performance programs and accounting or debiting data for services that are performed for the customer.

A corresponding user program that is customized to the requirements of the users for soho (small office & home office) markets is loaded into the hard drive 13 of the first personal computer PC 1. In such a market, the primary consideration is not the item count of franked letters per time unit, but is low outlay given moderate costs. A mere message could in fact be sent by e-mail, however, unique originals such as pictures, photographs, materials, etc., must be sent in packaged form in an envelope. The invention therefore assumes that the basic system composed of a computer and printer is already present at the user. Additional and expensive hardware components, for example a security module, can only be omitted in the terminal equipment when the franking unit is fashioned in conformity with the invention. For processing modern crypto technologies, the computer must be equipped—as to hardware—with a fast, modern processor and adequate memory.

The invention also assumes that communication connections via the network 40, for example those via the Internet, WWW (World Wide Web) or an ISDN, can be economically set up in the future.

In accordance with the invention the data center checks and, if necessary, produces an indication of the validity of a postal recipient address on the basis of a central data bank stored on the hard drive 23, but the franking unit checks the authenticity of the communicated postal recipient address before storage thereof in the local data bank. A public key is thereby preferably employed, this preferably being communicated from the correct data center together with the valid postal recipient address and with the signature. Only the correct data center can generate the authentic signature.

The check of the validity of an address assumes maintenance of the address datafiles of the central data bank by a mail carrier, or by a service appointed or contracted for that purpose by the mail carrier. For covering the costs that are thereby incurred, the use of the address datafiles by external users is billed to the user as a service subject to fee.

For implementing the check, at least the postal recipient address (mailing address) to be printed is first transmitted to the aforementioned data center. An incorrect spelling of the mailing address can be automatically corrected on the basis of the postal zip code or on the basis of a similar destination code when there is a corresponding datafile for the latter in the central data bank. This is also conversely true. When, however, an automatic correction is not possible, the user is informed of the need for a correction and is prompted to correctly enter the address. After the check, a postage value corresponding to the valid fee schedule and the valid, possibly corrected, mailing address with postal zip code is transmitted back to the franking unit, with the data to be sent back being operated with one another by a signature. As an intermediate step, a message is generated from the data to be communicated by applying a specific mathematical function that reduces the amount of data to be encrypted. The signature is generated by encryption of the message with a secret, private key according to a known asymmetrical encryption algorithm.

The digital signature algorithm (DSA), an elliptic curve digital signature algorithm (ECDSA) or the ELGamal algorithm (ELGA) are a suitable, known asymmetrical encryption algorithms. These signature algorithms have a key pair in common that comprises a private and public key. The private key is a secret write key that cannot be read out from the outside. The public key functions as read key for the signature and is accessible to anyone.

Such asymmetrical encryption algorithms applied to “closed systems” are disclosed in greater detail in German Application 197 48 954.0 entitled “Verfahren für eine digital druckende Frankiermaschine zur Erzeugung and Überprüfung eines Sicherheitsabdruckes”, (not published prior to the filing date of the present application). This German application is owned by the Assignee of the present application, Francotyp-postalia AG & Co., and corresponds to co-pending U.S. application Ser. No. 08/987,393, filed Dec. 9, 1997 (“Method for Operating a Digitally Printing Postage Meter to Generate and Check a Security Imprint,” Pauschinger). Differing from the inventive solution, however, a postage security device for encryption is utilized therein in the postage meter machine itself, this now being inventively omitted.

Instead, the hard drive 23 of the second computer 21 of the data center 20 has specifically secured memory areas for storing the private key, so that the latter cannot be read out from the outside. Alternatively, a separate. memory, for example a semiconductor memory, can be employed for secure storage of the private key, the memory being integrated in the computer and secured against unauthorized readout.

It is provided that the first computer 11 is programmed with a user program in the memory to

- access a stored, specific postal recipient address or intermediately store a newly input, specific postal recipient address,
- communicate request data of the mail sender by communication channel to the data center, whereby the request data comprise the identification data of the mail sender and postal shipping data, including the specific postal recipient address, in order to confirm the correctness of the postal recipient address with a second computer and produce this on the basis of an address datafile stored in the central data bank,
- receive data relating to a valid postal recipient address from an address datafile stored in the central data bank, a valid postage value and a signature, whereby the second computer of the data center only provides the requested data with a signature when a valid postal recipient address is stored in the central data bank, whereby a message is generated when an automatic correction of a postal recipient address is impossible,
- process the data received from the central data bank, including the signature, in order to print an authentic franking imprint onto the piece of mail.

It is also provided to check the authenticity of the received data communicated to the franking unit on the basis of the signature and, given authenticity, to update the address datafile in the local data bank with respect to the specific postal recipient address.

The inventive method for generating a valid dataset for franking imprints includes the following steps:

forming and communicating request data with which a first computer of the franking unit requests a signature from a second computer of a data center, the request data including at least one information group with the postal recipient address data and identification data;

generating a signature on the basis of verified data upon using an asymmetrical crypto algorithm and secret private key; as well as return transmission of the verified data and of the signature to the franking unit, the authenticity of the returned data being checked on the basis of the signature upon employment of a public key; as well as storing authentic, received data in a local data bank.

The second computer in the data center checks and, as required, produces an indication of the validity of the data, and the signature is generated from the requested data by the second computer in the data center. It is thus assured that the valid data partly returned that are received by the terminal equipment have been operated with one another by the second computer in the data center using the signature. According to the request, the first computer thus receives valid data via modem. The first computer undertakes a comparison on the basis of data of the information group communicated to the data center and data of a received information group, and an authenticity check with respect to the received information group is implemented with the signature, using a public key, that is fetchably stored in the central data bank or in a local data bank, in the authenticity check. If a deviation is found between the transmitted and received data as a result of the comparison, the dataset in the local data bank is only updated when the received data are considered authentic. At an arbitrary, later point in time, the first computer then generates a print image from the received data and correspondingly initiates a printout.

Keeping the postal recipient address data in the local data bank the same is thus preceded by an authenticity check on the basis of the signature in the personal computer PC 1. A public key that can be fetched from the central or from a local data bank is employed in the authenticity check. The public key can be stored in an unsecured memory area together with an appertaining data for when the validity takes effect.

Anyone can recover the message from the signature by decryption with the public key. For the purpose of comparison, a reference message is generated from the communicated cleartext data and the same aforementioned, specific mathematical function that reduces the data quantity is applied. Given equality of the decrypted message with the reference message that is formed, the authenticity of the data is established, their validity being assured by the data center, at least for the postal recipient address.

Whether a debiting has ensued in the data center can be checked in a post office 50 or in a mail delivery location, or at a facility of a private mail carrier at the same time as the authenticity check and in exactly the same way on the basis of the signature. To this end, a monotonously, steadily variable quantity enters into the signature, this being printed openly at the same time on the piece of mail in cleartext, or at least in machine-readable form. For example, the time data at the point in time the signature is fetched from the central data bank or the piece count can be used as such a quantity. At the same time, the bookkeeping data can be relocated in the data center on the basis of the printed time data or, respectively, piece count or some other quantity and payment for the service can thus be checked in detail.

To that end, the post office 50, or an authorized facility, can call the data center via a communication connection in order to interrogate data stored in its data bank.

Figure 2:
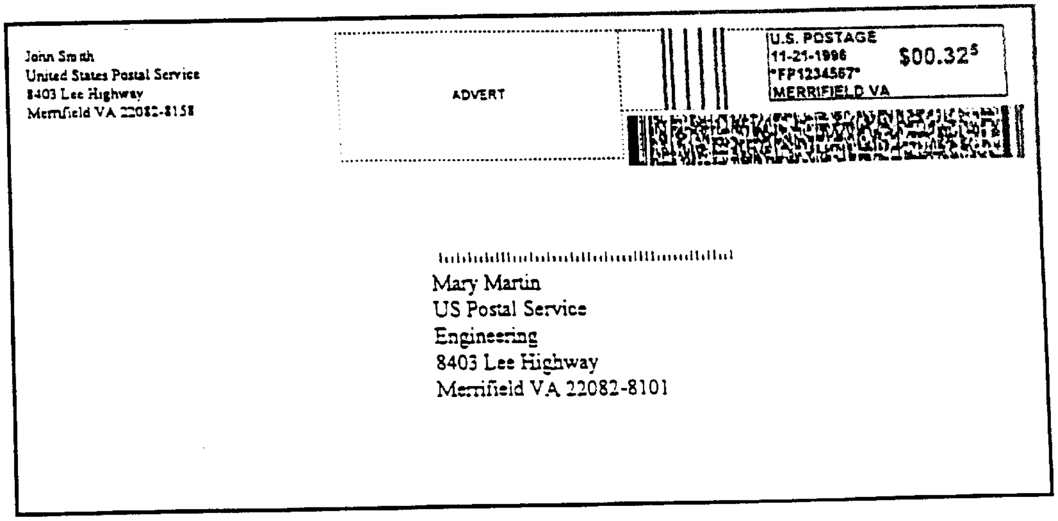
FIG. 2 shows an example of an imprint on a piece of mail produced in accordance with the invention.

An example of an imprint on a piece of mail is explained on the basis of FIG. 2. The address field is centrally arranged given a letter. The postal recipient address is printed in cleartext and an appertaining zip code is printed as a bar code. The franking imprint is arranged in the periphery at the upper right. A return address arranged in the periphery at the upper left is optional. For the USPS, an approximately one-inch wide franking imprint with a machine-readable area is generated. Specific clear data and the signature are converted into, for example, a PDF 417 symbolism and are printed. The latter has been disclosed in greater detail by Symbol Technologies, Inc., in European Application 439 682. The visually (human) readable area and an area for the FIM code according to US postal regulations are arranged over the machine-readable area. A further printing area lies to the left thereof, this being preferably employed for printing an advertizing slogan. Due to the FIM code, an approximately 11 through 14 mm wide visually (human) readable area arises for an approximately one-inch wide franking imprint. The remaining width thus can be employed for the machine-readable area.

In a preferred, first embodiment, the request data communicated to the data center can, in addition to the postage value, include further postal shipping data and a monotonously, steadily variable quantity. The postage value and further postal shipping data (express, air mail, etc.) are entered via the keyboard 14 of the personal computer PC 1 by the user for every letter.

The storage of the accounting or bookkeeping data corresponding to further services ensues in a central data bank. Since the debiting of the mail usage is undertaken in a customer-specific manner in the data center, a manipulation of the accounting data with fraudulent intent can be precluded. A local postage box or a meter is not needed at the user of the franking unit. The hard drive 23 contains memory areas provided for bookkeeping according to the declared type of accounting and type of service. In order to enhance the protection against data loss, at least one further hard drive 23' (not shown) in which a redundant storage of all data ensues is present in the data center.

One form of accounting for the aforementioned service of mail usage is a cumulative accounting at the end of the month, with the cumulative amount being debited from a customer account at a bank or a comparable financial institution according to the debit entry method. Some other form of accounting, for example immediate payment or pre-payment, can likewise be declared. A corresponding agreement with the customer can be made for different forms of accounting for different services.

In a second embodiment shipping data are transmitted and the service of calculating postage is also implemented in the data center, with the cumulative service costs being billed to the customer periodically, for example at the end of the day. To that end, it is advantageous for the request data that are transmitted to the data center together with the address data and other shipping data to also include identification data ID. Identification data ID include an identification number of the customer or of the sender of the mail or the machine serial number or the return address. In order to preclude fraud whereby some other sender is simulated, it is also provided that such identification data likewise enter into the signature. The data center generates a signature from the communicated request data such as the postal recipient address and identification data as well as from a generated, monotonously, steadily variable quantity and the postage value with the assistance of a private key and an asymmetrical encryption algorithm.

On the other hand, when, as in the first embodiment, the service of calculating postage is not implemented in the data center but in the franking unit, such costs cannot be at the expense of the customer; on the contrary, a discount must be granted since the computer of the data center is not unnecessarily occupied with such calculations.

In the second embodiment the received data that are partially transmitted back include a postage value calculated in the data center, a recipient address, identification data, a monotonously, steadily variable quantity and a signature, The data center calculates the monotonously, steadily variable quantity and determines the postage value according to a valid fee schedule from the transmitted request data such as postal recipient address and identification data as well as from other communicated shipping data. In a maximum version, the request data are generated simultaneously for a number of letters that the user has produced at the personal computer PC 1 that is a component of the franking unit. A number of different signatures allocated to the address and franking data is then also generated corresponding to the number of letters. The data that are transmitted back can be allocated to the as yet unauthorized letters by means of the address data.

As an alternative, shipping information as to the weight of the letter, determined, for example, by the number and the format and the weight of the individual pages of the letter, can be communicated per letter. The weight of the letter can be determined therefrom in the data center without having to connect a letter scale to the franking unit at the local user. As warranted, the data center enters into a user dialogue with the user during the communication via the display 12 in order to complete the data required for calculating the postage.

Given a minimal version, a signature is requested only for the following information: postal recipient address, postage value, identification data, piece count value. The piece count value is an unencrypted piece count imprint generated by a counter. An adequate protection against copying the imprint is already achieved with such a counter. When the collected mail is picked up by an employee of the mail carrier, the sender identification data and the counter reading reached by the counter can already be compared to the printed values.

The probability is also slight that a piece of mail of the same size and same weight will be sent to the same postal recipient on the same dispatch date. The probability can be reduced further by additionally requiring time of day data to be printed on the piece of mail. Alternatively, the time data can be offered by the data center with an exact clock (not shown).

In another version, all data to be printed onto the piece of mail are previously centrally stored. In the post office, the received mail can be checked with the assistance of the centrally stored data to determine whether copies of an imprint have been used with fraudulent intent. An entry in the central data bank can be undertaken in a special area for every received piece of mail. A double entry in the data bank then indicates a counterfeit imprint. By operating the postal recipient address with the postage value and piece count via the signature, it is impossible to copy one of the two, i.e., postal recipient address or, postage value, separately from one another for purposes of manipulation.

It is also provided that every key pair composed of a private key and a public key has a time limit on its validity and can be suddenly changed by the data center at a specific date and time of day. The time intervals of the change are determined according to modern analysis methods, for example differential crypto analysis, and are dimensioned such that an effort to break the security of the system has a high probability of failing.

The invention is not limited to the present embodiment since further, other arrangements or embodiments of the invention can be developed or utilized that, proceeding from the same basic idea of the invention, are covered by the attached claims.

Although modifications and changes may be suggested by those skilled in the art, it is the intention of the inventor to embody within the patent warranted hereon all changes and modifications as reasonably and properly come within the scope of his contribution to the art.

I claim as my invention:

1. A franking system comprising:

a franking unit containing a first computer and a memory, to which said first computer has access, with a local data bank for postal recipient addresses;

a printer connected to said first computer;

a second computer and a central data bank, to which said second computer has access, located at a data center remote from said franking unit;

a communication path allowing communication between said first computer and said second computer;

said first computer being programmed to obtain a specific postal recipient address and to formulate request data, dependent on at least one entry by an operator of said franking unit, and to communicate said request data via said communication path to said second computer, said first computer formulating said request data to include identification data identifying an authorized operator of said franking unit and postal shipping data including said specific postal recipient address;

said second computer being programmed to, upon reception of said request data, compare said specific postal recipient address to addresses in an address data file stored in said central data bank and to verify a correctness of said specific postal recipient address and, only if said specific postal recipient address in said request data is correct, to generate a postage value and a security signature and to transmit said postage value and said security signature as return data back to said first computer via said communication path, and if said specific postal recipient address is not correct and cannot be corrected at said second computer, to generate an error message and to transmit said error message back to said first computer via said communication path; and said first computer being programmed to receive said return data and to process said return data to produce an authentic franking imprint and to cause said authentic franking imprint to be printed on piece of mail by said printer.

2. A franking system as claimed in claim 1 wherein said first computer obtains said specific postal recipient address by intermediately storing a newly entered specific postal recipient address.

3. A franking system as claimed in claim 1 wherein said first computer obtains said specific postal recipient address by accessing a stored specific postal recipient address in said memory.

4. A franking system as claimed in claim 1 wherein said first computer is further programmed to check authenticity of said returned data and, only given authenticity, to update said address data file in said local data bank for said specific postal recipient address.

5. A franking system as claimed in claim 1 wherein said first computer is programmed to formulate said request data including data representing a requested postage value.

6. A method for generating valid data for franking imprints comprising:

providing a franking unit with a first computer;

providing a local data bank accessible by said first computer and storing a public key in said local data bank;

providing a data center, remote from said franking unit, with a second computer;

providing a communication path between said first computer and said second computer;

formulating request data in said first computer and communicating said request data via said communication path from said first computer to said second computer, said request data including at least one information group containing postal recipient address data and franking unit identification data, said request data requesting a security signature from said second computer;

generating said security signature in said second computer using said request data and an asymmetrical crypto-algorithm and a secret private key;

at said second computer, conducting a check for validity of said postal recipient address data;

if said postal recipient address data are valid, formulating return data, including a postage value calculated at the data center, a recipient address, identification data and a monotonously steadily variable quantity and said security signature, in said second computer, said second computer at said data center calculating said monotonously steadily variable quantity and determining said postage value according to a valid fee schedule from said request data, and generating said security signature from said request data and from said monotonously steadily variable quantity using said private key and said asymmetrical encryption algorithm;

transmitting said return data via said communication path from said second computer to said first computer;

in said first computer, fetching said public key from said local data bank and checking authenticity of said return data using said security signature and said public key by making a comparison of said information group contained in said request data and an information group contained in said return data;

if said return data are authentic, storing said return data in said local data bank and generating a print image in said first computer using said return data.

7. A method as claimed in claim 6 wherein the step of formulating said request data includes formulating request data including said postal recipient address data, additional postal shipping data and a monotonously steadily variable quantity.

8. A method as claimed in claim 7 comprising the step of using a time-related quantity as said monotonously steadily variable quantity.

9. A method as claimed in claim 7 comprising using a mail piece count as said monotonously steadily variable quantity.

10. A method as claimed in claim 6 comprising the step of using a time-related quantity as said monotonously steadily variable quantity.

11. A method as claimed in claim 6 comprising using a mail piece count as said monotonously steadily variable quantity.

12. A method as claimed in claim 6 comprising the additional steps of assigning a time limit to said private key and said public key and changing said time limit at said data center at a specific date and time of day.

* * * * *